Aug. 19, 1958     E. J. HERBENAR     2,848,056
POWER STEERING SYSTEM OF THE HYDRAULIC TYPE
Filed April 18, 1955     2 Sheets-Sheet 1
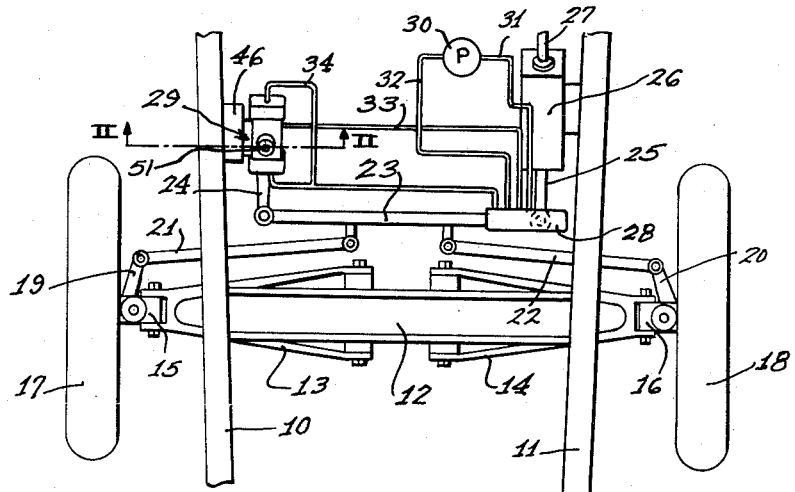
Fig.1
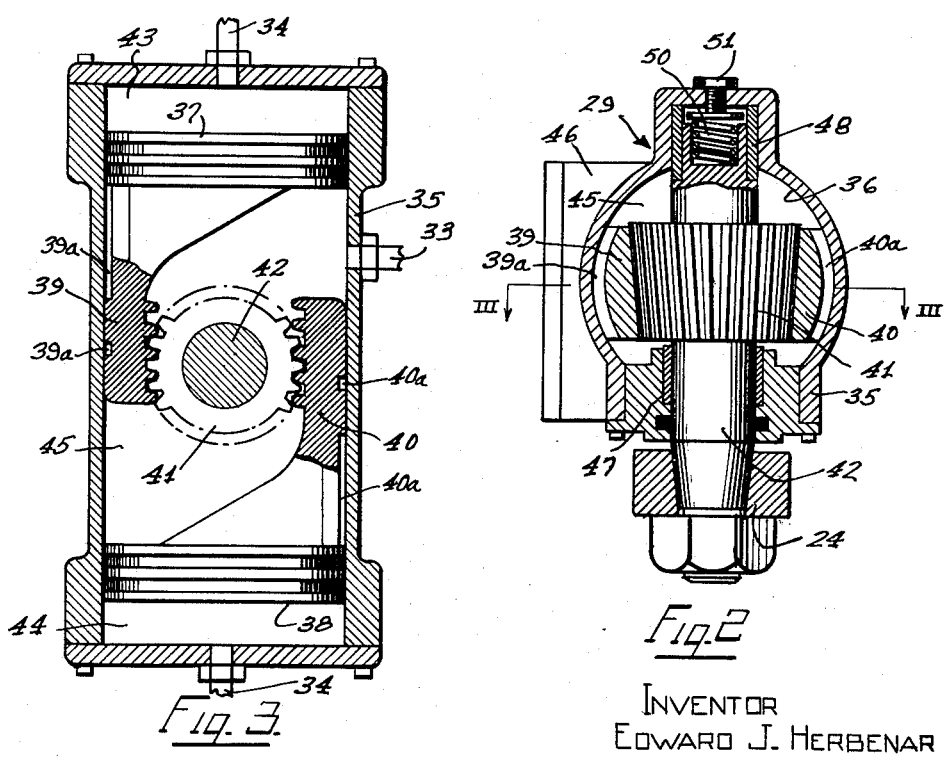
Fig.3     Fig.2
INVENTOR
EDWARD J. HERBENAR
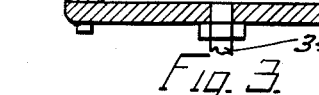
Attys.
By Aug. 19, 1958   E. J. HERBENAR   2,848,056
POWER STEERING SYSTEM OF THE HYDRAULIC TYPE
Filed April 18, 1955   2 Sheets-Sheet 2
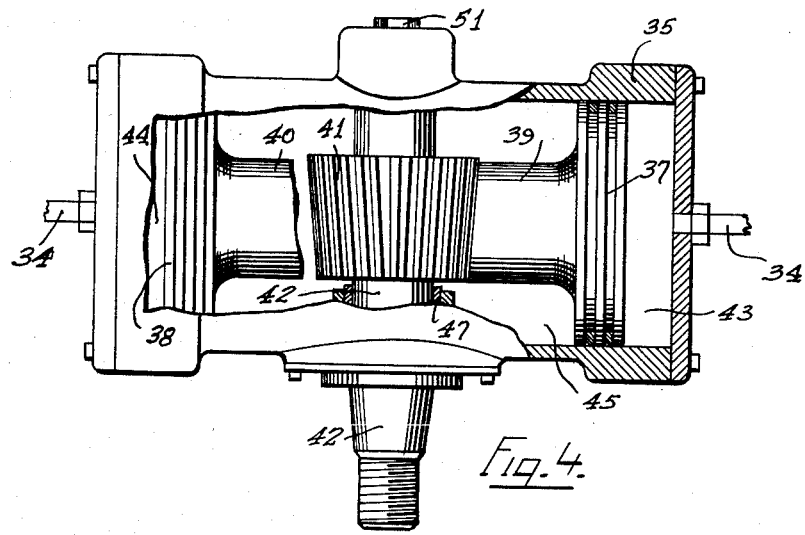
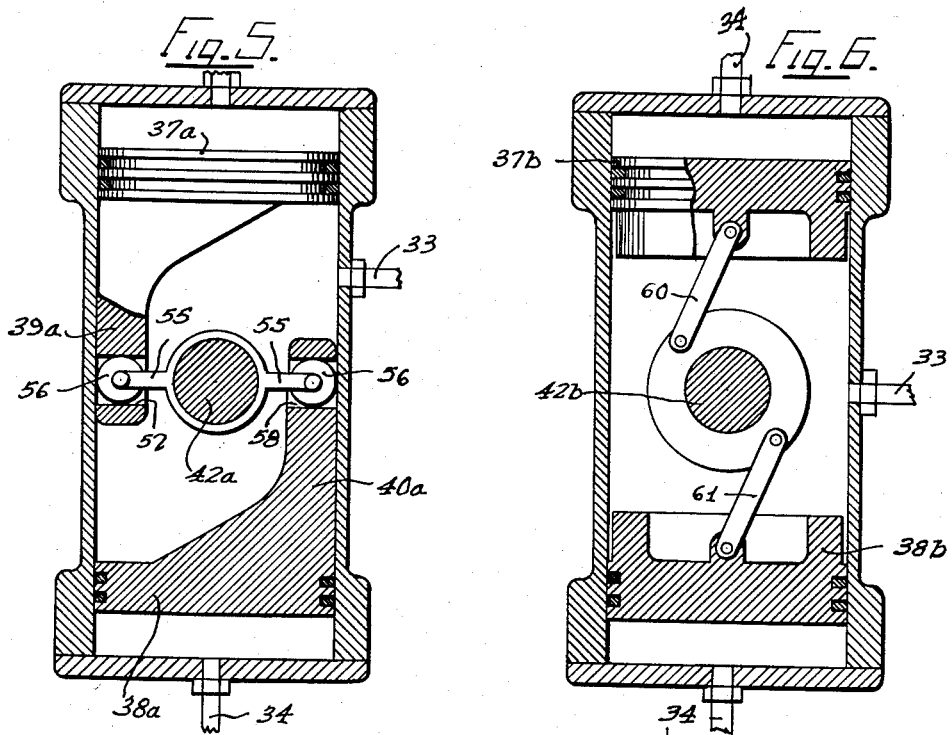
INVENTOR
EDWARD J. HERBENAR

United States Patent Office 2,848,056
Patented Aug. 19, 1958

2,848,056
POWER STEERING SYSTEM OF THE HYDRAULIC TYPE

Edward J. Herbenar, Detroit, Mich., assignor to Thompson Products, Inc., Cleveland, Ohio, a corporation of Ohio Application April 18, 1955, Serial No. 502,000

3 Claims. (Cl. 180—79.2)

The present invention relates to steering apparatus for automotive vehicles or the like and is, more particularly, concerned with the provision of an improved steering system employing a hydraulic power assist incorporating an improved hydraulic motor.

Power steering systems have recently become increasingly standard as original equipment in the automotive field. With this growing demand for power steering in general, a large number of different steering systems employing power assist have been developed. Those familiar with the needs of the automotive industry are aware, however, that none of the systems heretofore developed have proven wholly satisfactory.

As is well known in the art, the steering linkages presently used with automobiles require, for the most part, a large steering effort. Accordingly, any entirely satisfactory power steering system must be capable of operating at high pressures and exert very large forces while occupying a minimum of space. It is also considered desirable that the power motor of the system be attached to a portion of the wheel steering linkage apart from the steering column in order to provide means for preventing road shocks from transmission back through the steering column to the vehicle operator. The practical considerations just discussed, are, however, not the only considerations that must be included in a truly acceptable power steering system. For example, most prior art power steering systems have been found very noisy in operation. While such noise rarely affects the operativeness of the power steering system it is almost universally considered a very unsatisfactory and undesirable feature of the prior art systems since it has a psychological tendency to cause the vehicle operator or the passengers in the vehicle to consider the linkage loose and hence unsafe entirely aside from the average vehicle operator's dislike for extraneous noise.

In accordance with the principles of the present invention, a power steering system is provided in which the power assist force is applied directly to a pivotal link normally operating merely as an idler arm in the conventional parallelogram steering linkage. This power is applied by means of a motor of a reversible type in which pistons are provided but in which no piston rod displacement volumes need be compensated for to provide equal left and right hand turning forces. Further, although utilizing reciprocating piston members, the present system is substantially noiseless and is provided with automatic slack take-up means whereby clicks or other impact noises are substantially completely eliminated from the system. With the elimination of undesirable noise, the present invention also simultaneously has eliminated substantially all mechanical play or looseness in the steering geometry thereby providing an unusually efficient power steering system as a whole.

In accordance with the principles of the present invention, a power motor is secured to the automotive vehicle frame at a point on the side thereof opposite from the side on which the steering column itself is located. Preferably, the power motor is secured to the vehicle frame in such a manner that the output shaft of the motor rotates about an axis substantially parallel to the axis of the gear cross shaft which drives the conventional pitman arm. The motor output shaft is then secured to a power link which takes the place of a conventional idler arm, which is in turn connected at the opposite end of the drag link from the pitman arm for applying power assist to the drag link. Preferably, the power motor is a cylindrical motor having a transverse output shaft substantially midway between the opposite ends thereof and driven by a pair of reciprocating pistons. In the preferred embodiment of the invention, the pistons are positioned in a single cylinder and straddle the transverse output shaft. Additionally, the pistons are operatively secured to the output shaft to cause rotation thereof upon the simultaneous movement of the pistons toward each other or, alternatively, upon the simultaneous movement of the pistons away from each other.

Noise is substantially eliminated from the power motor forming the preferred embodiment of the present invention by means of an automatic take-up mechanism associated with the transverse motor output shaft. By providing a tapering mechanical connection between the output shaft and the straddle mounted pistons, axial movement of the output shaft will provide varying clearances between the output shaft and the pistons. Automatically actuable spring means are provided for maintaining a constant bias upon the output shaft and accordingly any wear or slack is automatically and constantly eliminated from the system.

By providing a straddle mounted reciprocating piston motor, a maximum power area is provided in the motor while at the same time the motor housing may be constructed approximately one-half as large as prior art reciprocating piston type motors of the same output capacity. Further, by positioning the motor at a point remote from the driver's seat vibrations or force impulses applied to the steering linkage by the motor are applied to the pitman arm and hence the steering column only through resilient joint structures thereby minimizing the transmission of vibrations to the hands of the vehicle operator, and by providing automatic wear take-up means in the power motor itself, all noise ordinarily emanating from the power steering motor upon application of power is likewise eliminated.

It is, therefore, an object of the present invention to provide a novel and substantially improved power steering system wherein vibrations ordinarily associated with the application of power by a hydraulic motor is eliminated.

Another object of the present invention is to provide an improved power steering linkage.

Still a further object of the invention is to provide an improved power steering motor having automatic take-up means associated therewith for preventing looseness during the application of power steering forces to the output shaft thereof.

Another object of the present invention is to provide an unusually compact and yet powerful power steering motor and associated linkage members.

A feature of the invention is the provision of a power motor having straddle mounted reciprocating pistons therein which cooperate with an automatically adjusting output shaft for the noiseless transmission of forces thereto.

Another feature of the invention is the provision of a power steering geometry for automotive vehicles wherein power is applied by means of a reciprocating type power motor which actuates a pivotal idler arm member secured to the opposite end of a drag link from the conventional manually actuated pitman arm.

Still another feature of the present invention is the provision of a power steering motor of high torque and only fractional rotation whereby the application of forces to the output shaft thereof is substantially uniform and without impulses causing noise.

3

Still other and further objects and features of the present invention will at once become apparent to those skilled in the art from a consideration of the attached drawings in which several preferred embodiments of the present invention are shown by way of illustration only and, wherein:

Figure 1 is a plan view of the apparatus of the present invention installed in an automotive vehicle showing the relationship of the power steering apparatus to the vehicle as a whole;

Figure 2 is a cross-sectional view of the power motor taken along the line II—II of Figure 1;

Figure 3 is a cross-sectional view taken along the line III—III of Figure 2;

Figure 4 is a side elevational view of the power motor, in partial cross-section, as viewed from the left in Figure 2;

Figure 5 is a plan view in cross-section of a modified form of power motor suitable for use in accordance with the teachings of the present invention; and Figure 6 is a further modified form of the present invention.

As shown on the drawings:

As may be seen from a consideration of Figure 1, the power steering system of the present invention is adapted for use with a conventional vehicle having a frame composed of side rails 10 and 11 connected by a cross member 12 pivotally carrying lower wheel control arms 13 and 14 which in turn support wheel support members 15 and 16. Wheels 17 and 18 are actuated by means of steering arms 19 and 20 secured respectively to the support members 15 and 16. Steering forces are transmitted to the arms 19 and 20 through tie rods 21 and 22 universally pivotally connected to the steering arms 19 and 20 and to the drag link 23.

The system as described above is conventional and is more or less diagrammatically shown in Figure 1. It will accordingly be understood that the dimensions and relative proportions of the parts may vary in actual practice somewhat from the illustration. Ordinarily, in such conventional systems, the drag link 23 is pivotally secured at one end to an idler arm 24 which is freely pivotally mounted to the frame 10 and at the other end to a pitman arm 25 which is rotated manually through reduction gears 26 by a steering column 27. In the present system, however, the idler arm 24 comprises a lever fixedly secured to the output shaft of a power cylinder to be described below and the connection between the pitman arm 25 and the drag link 23 comprises a power steering valve of the push-pull feel-back type now well known in power actuation systems. The specific details of the valve 28 do not form a part of the present invention and it will be understood that any type of push-pull valve may be utilized. For example, valves of the type generally illustrated in United States Patent No. 2,140,037 to Leon N. Swisher may be satisfactorily used to provide manual actuation below a predetermined steering torque determined by centering springs, and power motor actuation above the predetermined steering torque as a result of relative movement between the push-pull valve parts. Upon failure of the power system, valves of the Swisher type, or any other type suitable for use in systems of the present type, transmit, after slight lost motion, a direct application of manual power from the pitman arm to the drag link 23.

Motive power is supplied in the form of hydraulic fluid under pressure from a conventional pump source 30 preferably driven by the fan belt or other similar power take off associated with the vehicle engine. The high pressure output of the pump is directed through a conduit 31 to the valve 28 and exhaust return conduit 32 returns low pressure fluid to the pump. The valve 28 selectively directs fluid under pressure to the power motor 29 by conduit 33 or 34.

4

A preferred form of the power motor 29 is shown in Figures 2, 3 and 4. As there shown, a generally tubular housing 35 is provided with a cylindrical bore 36 in which a pair of pistons 37 and 38 are reciprocably mounted. The pistons 37 and 38 are integrally secured to power output racks 39 and 40, respectively, which are in turn mounted in straddle relation to the pinion 41 rigidly secured to the output shaft 42. Cut out spaces 39a and 40a are provided to insure lubrication and to minimize lateral pressures applied to racks 39, 40 by fluid between pistons 37 and 38.

Reciprocation of the pistons 37 and 38 toward each other, causing rotation of the pinion 41 in the counterclockwise direction as viewed in Figure 3, is caused by the application of pressure to chambers 43 and 44 through the pressure conduit 34. Reverse steering operation, on the other hand, is caused by reciprocation of the pistons 37 and 38 away from each other, resulting from the application of fluid pressure to the centrally positioned chamber 45 through conduit 33.

As may be seen from Figures 1 and 2, the power motor 29 is secured to the frame member 10 by means of a bracket 46 and accordingly the output shaft 42 forms the pivot for the arm 24, thereby functioning not only as a source of power for the steering system but also as an idler arm and pivot for maintaining the drag link 23 and the tie rods 21 and 22 in their proper relationships.

As above noted, power applications necessary for the turning of modern vehicles, especially during low speed turns such as parking turns, must be of substantial magnitude. Further, the application of the steering forces is in many instances sudden and of rapid pressure build-up. It has been found in most prior art devices that these characteristics not only cause deformations in the vehicle steering linkages but also cause undesirable noises that are not only audible but may be physically felt by the operator since the vibrations causing the noise in many cases are associated with the steering column and are transmitted directly through it to the operator's hands.

In accordance with the present invention, and as illustrated in Figures 1 through 4, the power motor is of unusually efficient design in that it provides force applications equal to twice those available in ordinary power cylinder structures having a single cylinder. Applicant's high-torque, compact, power motor is rigidly secured to the vehicle frame at a point remote from the operator and applies power directly to the drag link at the pivotal idler arm connection thereof so that no transverse components of force are applied to the drag link upon power application. Since the power motor housing 35 is directly secured to the frame member 10 and the power of the motor is applied to the shaft 42 between spaced bearings 47 and 48 effectively associated with the rigid attachment bracket 46 and the frame 10, the high torque applications applied by the motor are unable to twist or otherwise deform the steering linkage geometry. Further, in view of the fact that the power motor is secured at the remote spot shown in Figure 1, any power vibrations or slight deformations that may on occasion occur are substantially independent of the steering column 27 and accordingly are not directly felt by the vehicle operator.

Noise caused by actuation of the motor parts themselves is substantially completely eliminated by means of an automatic wear take up structure clearly seen in Figures 2 and 4. As may there be seen, the pinion gear 41 is cut with an axial taper and the racks 39 and 40 are also provided with teeth machined on a complementary taper. The shaft 42 is axially biased downwardly by a spring 50 adjustably tensioned by screw 51. As a result of this construction, the gear 41 is constantly urged into snug engagement with the teeth on both racks 39 and 40, thus eliminating slack in the system. Elimination of slack prevents impact forces from being applied to the pinion 41 and hence the drag link 23 thereby substantially eliminating noise ordinarily taking the form of a distinct "click" or "clank" in prior art constructions. Elimination of the play in the connection between the racks 39, 40 and the pinion 41 also prevents abrupt application of power to the drag link 23, thereby effecting a substantially improved and unusually smooth valve operation at the connection between the pitman arm 25 and the drag link 23.

The automatic adjustment feature above discussed provides a further important advantage in preventing undue wear on the relatively thin pistons 37 and 38. Since the racks 39 and 40 are rigidly secured to the pistons the application of forces to the pistons will tend to rock the pistons in one direction or the other about the longitudinal axis of the racks, tending to move the racks inwardly or outwardly away from the gear 41. Such tilting motion, if permitted, would cause, over a period of time, a rounding of the piston walls as well as impact wear on the walls of the cylinder 36. By providing automatic take up, as described, the racks 39 and 40 are at all times maintained snugly in position against the cylinder wall 36 and cocking or tilting of the pistons 37 and 38 is prevented.

Modified forms of the power motor illustrated in Figures 1 through 4, are shown in Figures 5 and 6. In Figure 5, gear teeth are dispensed with on both the racks 39a and 40a and the shaft 42a. In their place, the shaft 42 is provided with crank arms 55 carrying rollers 56 adapted to fit snugly within rectangular slots 57 and 58 in the racks 39a and 40a respectively. In Figure 6, the shaft 42b is connected directly to the pistons 37b and 39b by pivotal links 60 and 61 respectively.

The modified forms shown in Figures 5 and 6 are similar to the form shown in Figures 1 through 4 to the extent that they likewise provide a substantially silent motor. This is true since in the structure shown in Figure 5, extremely close tolerances may be initially observed in the rollers 56 and the slots 57, 58. Such tolerances are, of course, substantially impossible of mass production in meshing gear teeth but are capable of manufacture where rollers are utilized since binding is substantially eliminated in roller-plane surface contact. Likewise, in Figure 6, the pistons 37b and 39b are directly pivotally connected to the shaft 42b thereby eliminating slack.

It will be noted, however, that the modifications shown in Figures 5 and 6 do not provide a constant application of torque to the shaft 42a or 42b independently of the angular position of the latter. This variation is inherent in the cam or pivotal link connection and while fully operable is less satisfactory than the constant ratio system shown in Figures 1 through 4 when sound vibrations resulting from slack have been eliminated in a manner such as hereinabove described.

It will thus be seen that I have developed a substantially improved, unusually quiet, compact, and simple power steering system capable of ready mass production and installation in substantially any presently manufactured automotive vehicle. In view of the fact that the power motor of the present invention substantially takes the place of the conventional idler arm now used in modern automotive steering geometry, and the system utilizes a drag link-pitman arm type of push-pull valve, the system may be attached as an accessory in most vehicles by providing slightly modified forms of motor attachment brackets 46. The resulting power steering system is substantially noiseless and provides smooth power applications to the drag link without causing deformation of the steering column or other parts directly associated with the vehicle operator. Actual operation of this system in the field has proven its unusual quality of noiselessness and has also shown the effectiveness of removal of the power motor to a point remote from the vehicle operator and mounting the motor such that torques supplied by it do not deform the motor components between support bearings, or the vehicle frame cross members.

It will be understood that variations and modifications may be made relative to the structure hereinabove set forth without departing from the scope of the novel concepts of my invention and it is my intention therefore, that the present invention be limited solely by the scope of the hereinafter appended claims.

I claim as my invention:

1. A power motor for slack-free actuation of a vehicle steering linkage, comprising a fluid motor having a single cylindrical bore therein, an output shaft lying transversely of said bore and intersecting the axis thereof, bearings positioned at opposite sides of said bore for supporting said shaft, a pair of pistons reciprocably mounted in said bore on opposite sides of said shaft and straddling said shaft at a point between said shaft supporting bearings, means connecting said pistons to said shaft, and a lever arm fixedly secured to said shaft adjacent one of said bearings and adjacent said power motor and having its opposite end pivotally connected to said linkage, said means connecting said pistons to said shaft comprising a spur gear on said shaft and mating gear teeth on each of said pistons, said spur gear having an axial taper for co-operation with complemental tapers on said piston teeth, and means biasing said shaft axially to urge said tapers together to provide a slack free mechanical connection.

2. A power steering system comprising a dirigible wheel, a push-pull link steeringly connected to said wheel, manual means secured to one end of said link for actuating said wheel and power means pivotally connected to the opposite end of said link to actuate said wheel, said power means comprising a fluid motor having a single cylindrical bore therein, an output shaft lying transversely of said bore and intersecting the axis thereof, bearings positioned at opposite sides of said bore for supporting said shaft, a pair of pistons reciprocably mounted in said bore on opposite sides of said shaft and straddling said shaft at a point between said shaft supporting bearings, means connecting said pistons to said shaft, and a lever arm fixedly secured to said shaft adjacent one of said bearings and adjacent said power motor and having its opposite end pivotally connected to said link, said means connecting said piston to said shaft comprising a spur gear on said shaft and mating gear teeth on each of said pistons, said spur gear having an axial taper for cooperation with complemental tapers on said piston teeth, and means biasing said shaft axially to urge said tapers together to remove slack from said connection.

3. A fluid motor comprising a housing having a single longitudinal extending cylindrical bore therethrough, a pair of end caps closing the ends of said bore, a pair of pistons reciprocably mounted in said bore, each of said pistons having a rack rigidly secured adjacent a portion of the peripheral edge thereof, a rotatable output shaft supported for rotation about an axis transverse to the axis of said bore and intersecting the axis of said bore, axially tapered gear means on said shaft, said racks being tapered to complement said gear and being positioned astraddle said gear whereby fluid pressure applied between said pistons and said heads will cause rotation of said shaft in one direction and application of pressure between said pistons will cause rotation of said shaft in the opposite direction, and means urging the gear axially to wedge the teeth on said gear and said racks into intimate slack-free engagement.

References Cited in the file of this patent

UNITED STATES PATENTS

| 955,896 | Morrison | Apr. 26, 1910 |
| 2,168,215 | Keitel | Aug. 1, 1939 |
| 2,447,815 | Price | Aug. 24, 1948 |
| 2,531,695 | MacDuff | Nov. 28, 1950 |

FOREIGN PATENTS

| 445,033 | Germany | May 28, 1927 |